(12) United States Patent
Ko et al.

(10) Patent No.: US 11,955,664 B2
(45) Date of Patent: Apr. 9, 2024

(54) BATTERY MODULE

(71) Applicant: AMITA TECHNOLOGIES INC., Taoyuan (TW)

(72) Inventors: Chueh-Yu Ko, Taoyuan (TW); Hou-Chi Chen, Taoyuan (TW); Chia-Wen Yen, Taoyuan (TW); Ming-Hsiao Tsai, Taoyuan (TW)

(73) Assignee: AMITA TECHNOLOGIES INC., Taoyuan (TW)

( * ) Notice: Subject to any disclaimer, the term of this patent is extended or adjusted under 35 U.S.C. 154(b) by 79 days.

(21) Appl. No.: 17/697,833

(22) Filed: Mar. 17, 2022

(65) Prior Publication Data
US 2023/0145017 A1   May 11, 2023

(30) Foreign Application Priority Data
Nov. 9, 2021   (TW) ................................ 110141687

(51) Int. Cl.
| | |
|---|---|
| *H01M 50/536* | (2021.01) |
| *H01M 50/51* | (2021.01) |
| *H01M 50/54* | (2021.01) |
| *H01M 50/543* | (2021.01) |
| *H01M 50/512* | (2021.01) |

(52) U.S. Cl.
CPC ......... *H01M 50/536* (2021.01); *H01M 50/51* (2021.01); *H01M 50/54* (2021.01); *H01M 50/543* (2021.01); *H01M 50/512* (2021.01)

(58) Field of Classification Search
CPC .... H01M 50/54; H01M 50/51; H01M 50/512; H01M 50/536; H01M 50/543
See application file for complete search history.

(56) References Cited

U.S. PATENT DOCUMENTS

| | | | | |
|---|---|---|---|---|
| 2010/0323234 A1* | 12/2010 | Kim | ................... | H01M 50/574 |
| | | | | 429/158 |
| 2013/0078506 A1* | 3/2013 | Guen | ................ | H01M 10/0436 |
| | | | | 429/179 |

FOREIGN PATENT DOCUMENTS

| | | | |
|---|---|---|---|
| CN | 103178293 A | 6/2013 | |
| CN | 104600236 A | 5/2015 | |
| CN | 107425159 A | 12/2017 | |
| TW | M624127 U | 3/2022 | |
| WO | WO-2013187687 A1 * | 12/2013 | ............ H01M 10/48 |

\* cited by examiner

*Primary Examiner* — Milton I Cano
*Assistant Examiner* — Albert Michael Hilton
(74) *Attorney, Agent, or Firm* — Chun-Ming Shih; HDLS IPR SERVICES

(57) ABSTRACT

A battery module includes an insulating base, a pair of electrodes and multiple battery packs. Each electrode is installed to the insulating base and has a bridge portion and a wire connecting part exposed from the insulating base, and a pair of lugs is extended smoothly from each battery pack, and an end of at least a part of the lugs is attached to each bridge portion correspondingly. Therefore, the lug is not being twisted or deformed easily, and the battery module may have good conductive efficiency, long service life, and convenience of changing the battery pack.

8 Claims, 5 Drawing Sheets

BATTERY MODULE

BACKGROUND OF THE DISCLOSURE

Technical Field

The technical field relates to a battery module, and more particularly relates to a battery module with the features of uneasily twisted or deformed lugs, good conductive efficiency, and convenient change of battery packs.

Description of Related Art

Lithium-iron battery with the features of high energy conversion efficiency, long service life and high stability has gradually been widely used in various electronic products. In order to avoid producing abnormal pressure inside the lithium-iron battery during the use of a lightweight lithium-iron battery, most manufacturers use a flexible soft bag for the outer packaging of the lithium-iron battery, and this kind of battery is called a soft pack battery (such as a laminate polymer battery or a polymer battery) which can be connected with other soft pack batteries in series or parallel according to the different power supply requirement so as to form a battery module used for the power supply of an electronic device.

In general, when the soft pack battery is connected in series or parallel, a lug of each soft pack battery is connected to an electrode column by welding. However, the lug of each soft pack battery may be twisted or deformed easily when the lug is connected to the electrode column, especially for the lug of the soft pack battery far away from the electrode column. As a result, the impedance at the twisted or deformed position of the lug may increase greatly, so that the temperature at the twisted or deformed position of the lug may increase, and the lug may be broken or cracked by the shear stress, leading to poor conductive efficiency, short service life, and difficult replacement and maintenance of the soft pack battery.

In view of the aforementioned drawbacks, the inventor proposes this disclosure based on his expert knowledge and elaborate researches to overcome the drawbacks of the related art.

SUMMARY OF THE DISCLOSURE

Therefore, it is a primary object of this disclosure to provide a battery module with the features of uneasily twisted or deformed lugs, good conductive efficiency, and convenient replacement or maintenance of a battery pack.

In order to achieve the object mentioned above, this disclosure provides a battery module which includes an insulating base, a pair of electrodes and a plurality of battery packs, and each electrode is installed on the insulating base and has a bridge portion and a wire connecting part exposed from the insulating base, and each battery pack has a pair of lugs smoothly extended from the battery pack, and an end of at least a part of the lugs is attached to each bridge portion correspondingly.

This disclosure has the following effects: A stud extended perpendicularly from the wire connecting part in a direction away from the bridge portion may facilitate a wire connection for users. With the series electrodes, the positive lug and the negative lug of different battery packs are connected to achieve a series connection of two battery packs. An insulating tape attached on a side of each battery pack and an outer side of the lug may initially fix each battery pack and the lug. A detection column disposed protrusively on a turning section of the series electrode and passing through a base plate is provided for facilitating measurement of the voltage and current to know whether the circuit is normal without removing the power supply module. A shell mounted on the exterior of the battery pack is provided for protecting the battery pack and preventing the battery pack from being deformed or damaged.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
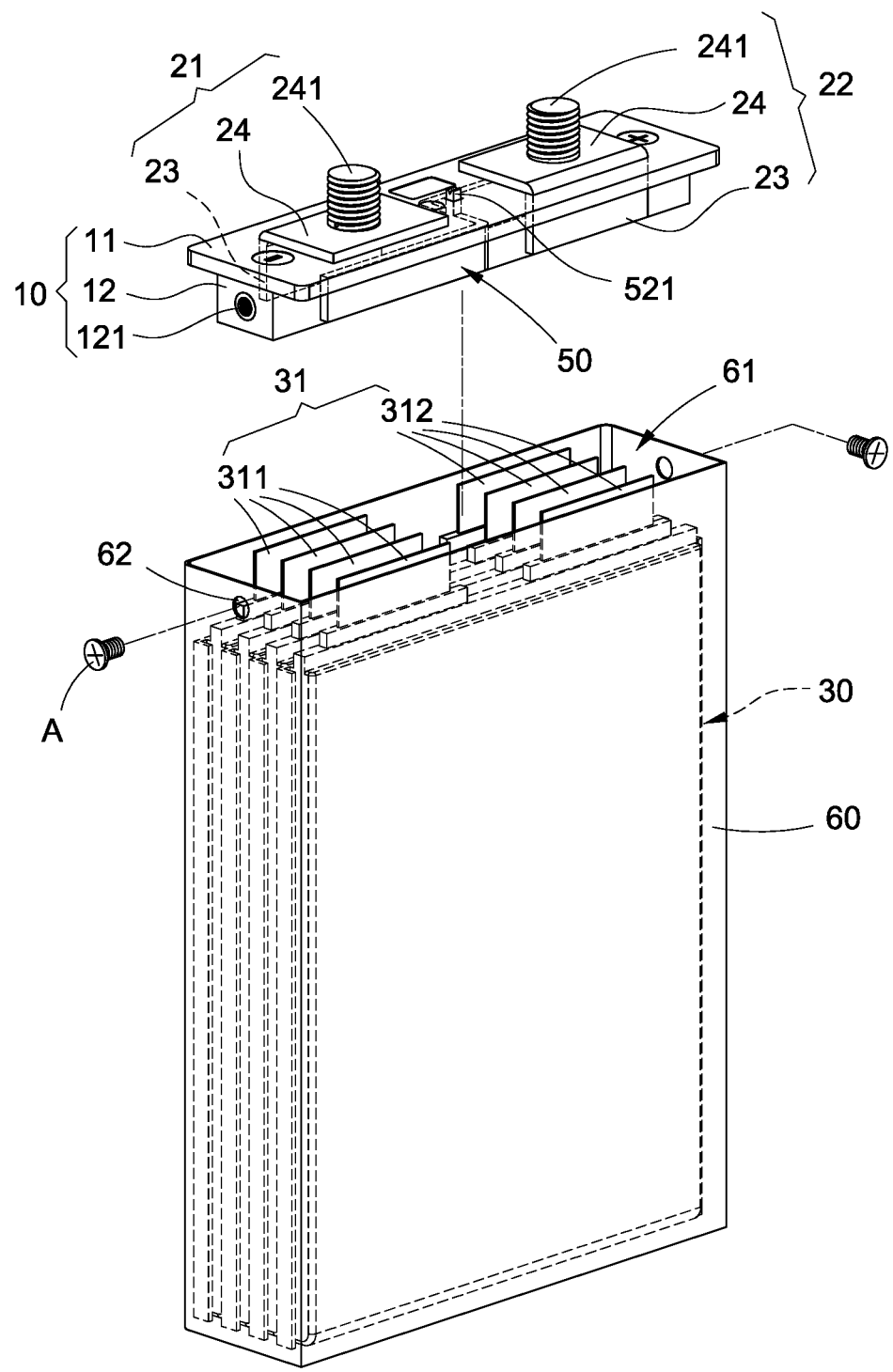
FIG. 1 is an exploded view of an insulating base and a shell of this disclosure.
Figure 2:
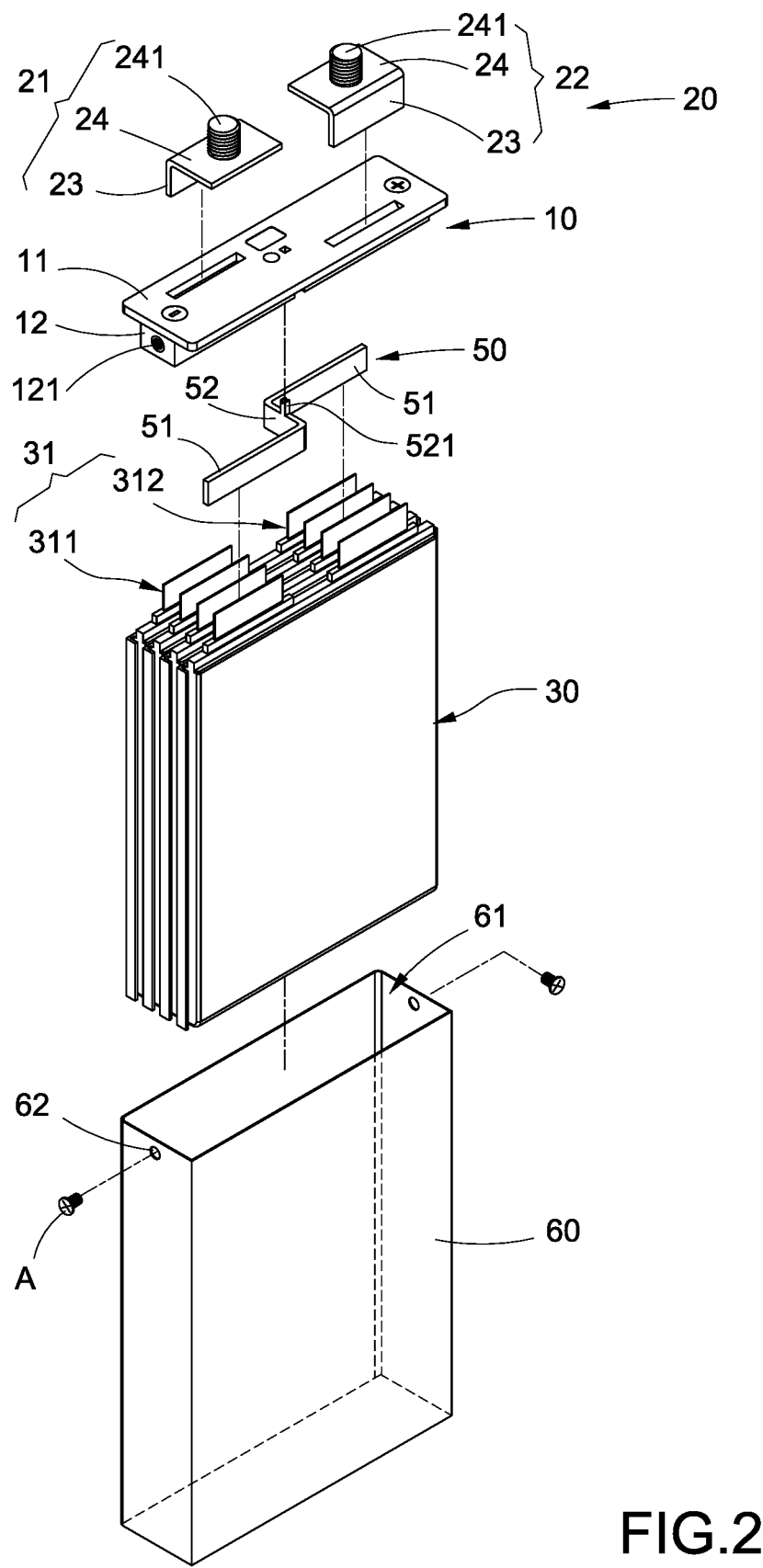
FIG. 2 is an exploded view of a battery module of this disclosure.
Figure 3:
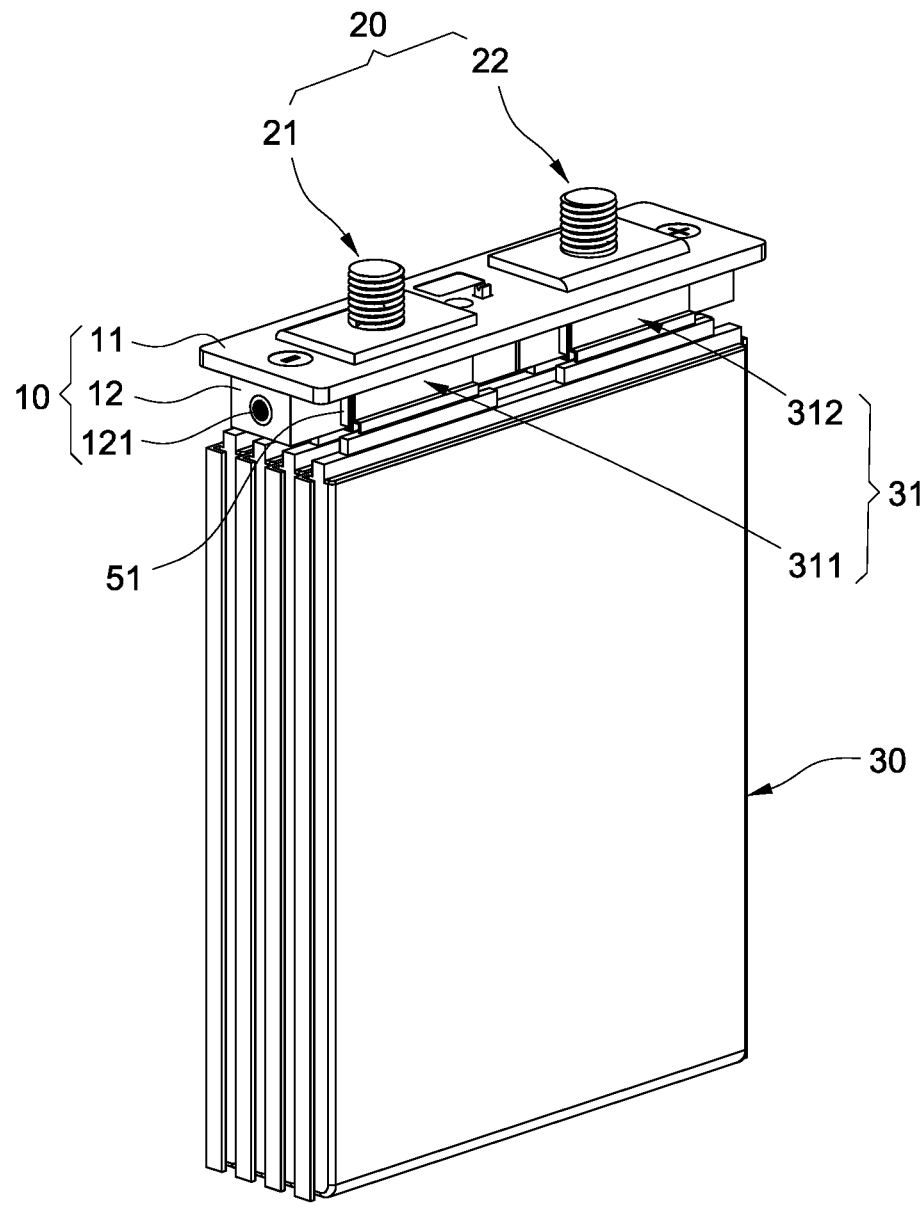
FIG. 3 is a perspective view of a battery module of this disclosure.
Figure 4:
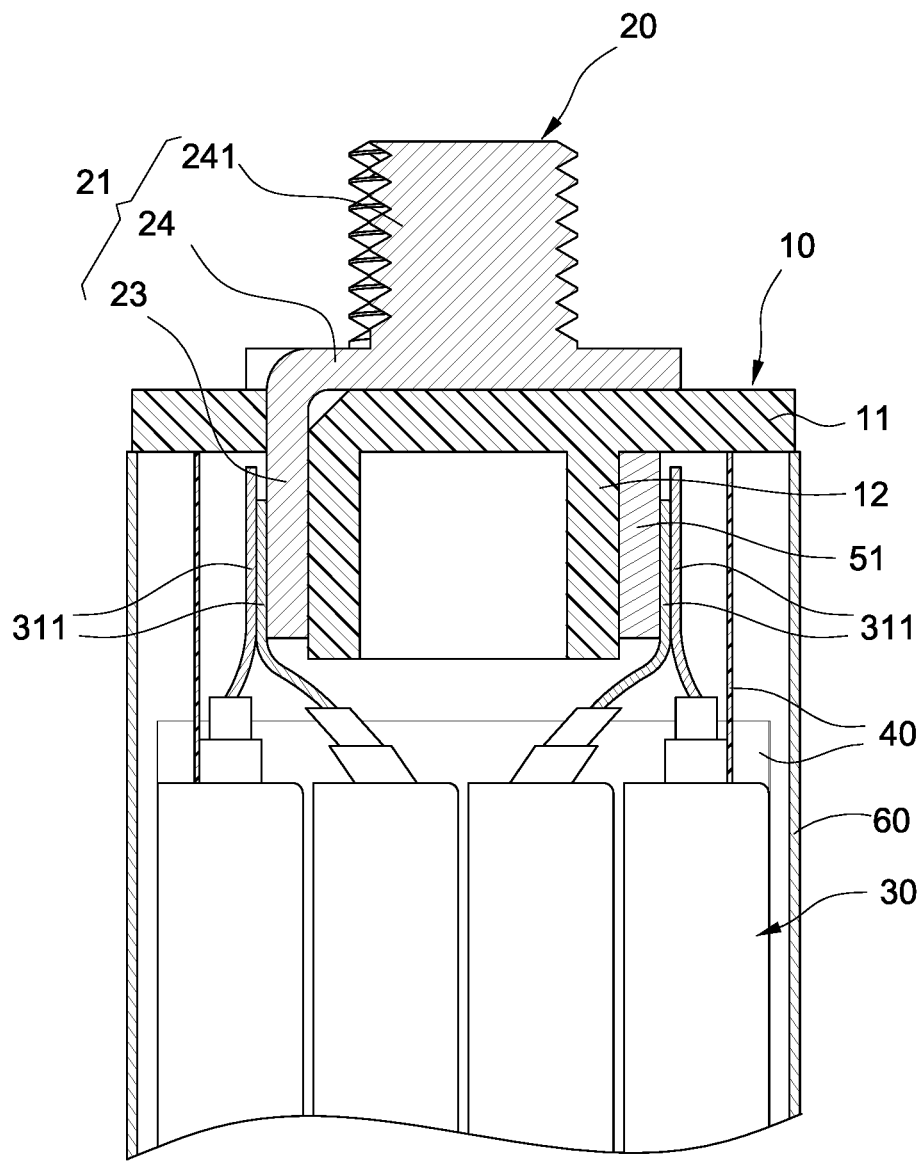
FIG. 4 is a cross-sectional view of a battery module of this disclosure.
Figure 5:
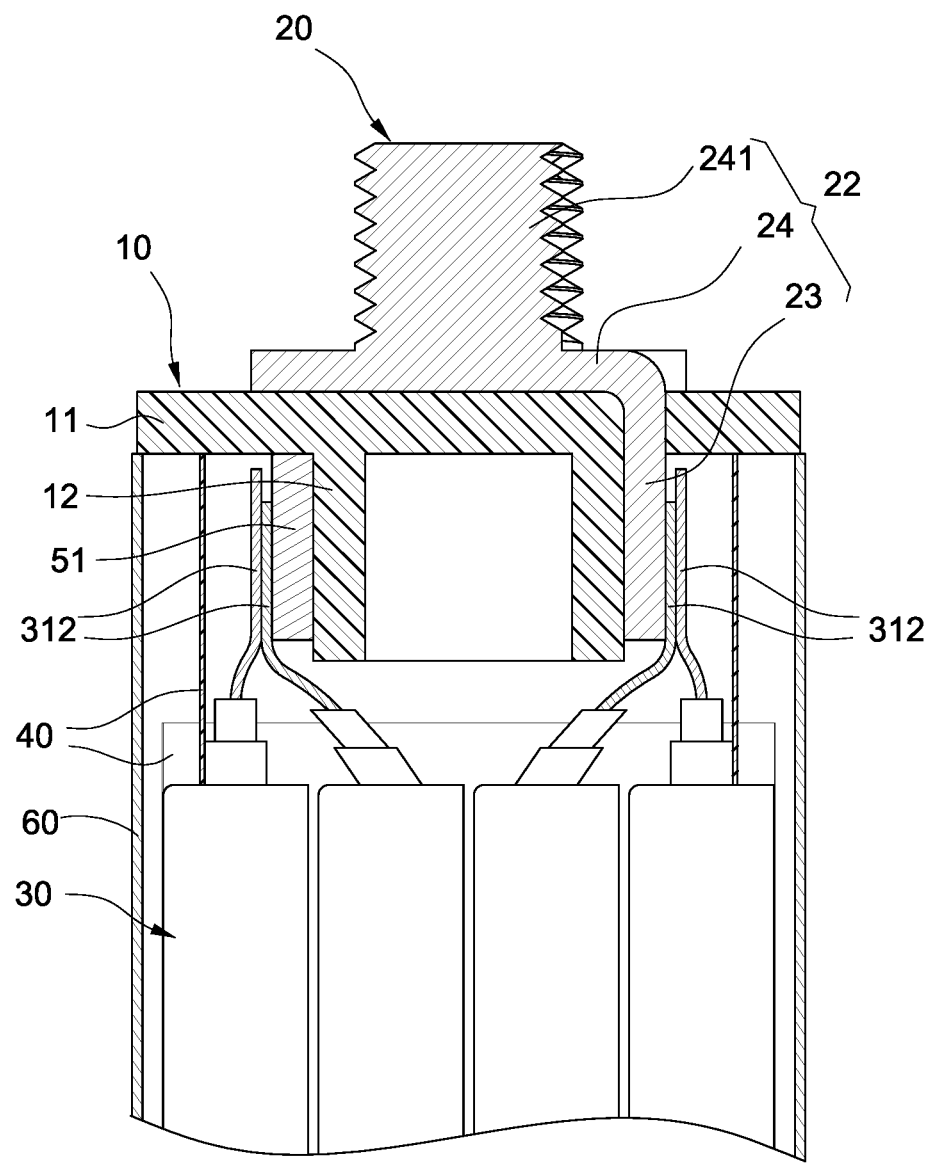
FIG. 5 is another cross-sectional view of a battery module of this disclosure.

With reference to FIGS. 1 to 5 for a battery module of this disclosure, the battery module includes an insulating base 10, a pair of electrodes 20 and a plurality of battery packs 30.

The insulating base 10 is in the shape of a long strip, and may be made of plastics or any other insulating material with desirable properties, and this disclosure is not limited to such arrangement. Specifically, the insulating base 10 includes a base plate 11 and a partition 12 installed on the center of the bottom of the base plate 11.

The pair of electrodes 20 include a positive electrode 21 and a negative electrode 22, and each electrode 20 may be a copper plate, but this disclosure is not limited to such arrangement, and any metal plate with desirable conductivity may be used instead. Each electrode 20 is erected from the insulating base 10 and has a bridge portion 23 and a wire connecting part 24 exposed from the insulating base 10. Specifically, each bridge portion 23 is embedded in the insulating base 10, and each wire connecting part 24 is protruded and exposed from the top of the base plate 11. In this embodiment, each wire connecting part 24 is bent perpendicularly from the corresponding bridge portion 23, so that each wire connecting part 24 is horizontally attached on the outer surface of the base plate 11 of the insulating base 10, but this disclosure is not limited to such arrangement, for example, each wire connecting part 24 and the corresponding bridge portion 23 may be non-bended plates disposed on the same plane and collectively perpendicular to the base plate 11. In some embodiments, each wire connecting part 24 further has a stud 241 extended perpendicularly in a direction away from each bridge portion 23, so as to facilitate the wire connection for users. In this embodiment, the bridge portions 23 are disposed on the left and right sides of the partition 12 separately, but this disclosure is not limited to such arrangement, for example, the bridge portions 23 may be disposed inside the partition 12, or the bridge portions 23 may be disposed on the same side of the partition 12, and the structure may be adjusted according to design requirements.

Each battery pack 30 has a pair of lugs 31 extended smoothly from the top of the battery pack 30, at least a part of the lugs 31 having an end attached and electrically coupled to each corresponding bridge portion 23. The pair of lugs 31 of each battery pack 30 include a positive lug 311 and a negative lug 312, and at least a part of the positive lug 311 is attached to the bridge portion 23 of the positive electrode 21, and at least a part of the negative lug 312 is attached to the bridge portion 23 of the negative electrode 22. In this embodiment, each lug 31 and each bridge portion 23 are connected by welding (such as surface mount technology (SMT) or laser welding), but this disclosure is not limited to such arrangement, as long as each lug 31 and each bridge portion 23 are able to be fixed to each other and maintain the electrical connection. Therefore, each lug 31 is smoothly attached and is not being bent easily, so that the lug 31 may maintain a desirable conductive efficiency. Further, the impedance is low to prevent over-heating or generating shear stress that leads to a crack or break, so as to extend the service life of each battery pack 30, and provide a quick and convenient way for maintenance personnel to remove a weld for replacing, maintaining, or repairing the battery packs 30. In some embodiments, the battery module of this disclosure may further include a plurality of insulating tapes 40. Each insulating tape 40 is attached to an edge of each battery pack 30 and the outer side of the lug 31 to initially fix each battery pack 30 and the lug 31 and effectively achieve the insulating effect to avoid other matters from affecting the conductive efficiency of each battery pack 30. In this embodiment, the insulating tape 40 may be a PI (KAPTON) tape with high temperature resistance and flame retardant rating above UL-VO, but this disclosure is not limited to such arrangement.

The way of connecting a different quantity of battery packs 30 into the battery module is elaborated below.

If the quantity of battery packs 30 is equal to two, and the two battery packs 30 are connected in parallel, the positive lug 311 of one of the battery packs 30 is attached and connected to the bridge portion 23 of the corresponding positive electrode 21, and the negative lug 312 is attached to the bridge portion 23 of the negative electrode 22, and the two bridge portions 23 of the positive electrode 21 and negative electrode 22 are disposed on the same side of the partition 12 or inside the partition 12 to maintain the battery pack 30 in a vertical configuration. The positive lug 311 of the other battery pack 30 is attached to the outer side of the positive lug 311 of the aforementioned battery pack 30 and the negative lug 312 is attached to the outer side of the negative lug 312 of the aforementioned battery pack 30. Therefore, each positive lug 311 is electrically coupled to the positive electrode 21 and each negative lug 312 is electrically coupled to the negative electrode 22, so that the two battery packs 30 are connected in parallel.

When the quantity of battery packs 30 is equal to two, and the two battery packs 30 are connected in series, the battery module of this disclosure may further include a series electrode 50. The series electrode 50 may be a metal plate with desirable conductivity, which is installed to the partition 12 of the insulating base 10. Specifically, the serially connected electrode 50 is in a thunderlight shape and has two welding sections disposed on the left and right sides of the partition 12 respectively and a turning section 52 buried in the partition 12. The positive lug 311 of one of the battery packs 30 and the negative lug 312 of the other battery pack 30 are attached to the two welding sections 51 respectively, and the rest of the other negative lugs 312 and the other positive lugs 311 are attached to the bridge portion 23 of the negative electrode 22 and the bridge portion 23 of the positive electrode 21, so that the two battery packs 30 are connected in series by the series electrode 50. In this embodiment, the series electrode 50 is a plate made of a composite material, which is produced by mixing zinc, copper, silver, lead, or tin, or other metals, and the proportion of the metals may be adjusted according to the current threshold value of different requirements, and thus this disclosure does not limit to any particular proportion. If the current exceeds a specific threshold value, a fusion mechanism may be produced to avoid any overcurrent that affects other battery packs 30 and the whole circuit, and disconnect the serially connected battery packs 30, so as to prevent other battery packs 30 from the chain reaction of being damaged.

When the quantity of battery packs 30 is equal to four, each two battery packs 30 are paired into one group and connected in parallel, and the two groups are connected in series, which is similar to the series connection of two battery packs 30. The difference is that the additional two battery packs 30 are disposed on left and right sides respectively, and the positive lug 311 and negative lug 312 of the additional two battery packs 30 are attached to the outer sides of the positive lugs 311 and negative lug 312 of the adjacent battery pack 30 respectively. Therefore, the additional two battery packs 30 may be connected in parallel with the two original serially connected battery packs 30, so as to achieve the series connection effect of the two parallelly connected battery packs 30.

Further, a detection column 521 is disposed protrusively on the turning section 52 of the series electrode 50 and passes through the base plate 11 of the insulating base 10 to facilitate measurement of the voltage and current for users for knowing whether the current between the battery packs 30 is normal without the need of removing the power supply module, but this disclosure does not specifically limit the position of the detection column 521. In addition, the battery module of this disclosure may further include a shell 60 which is a hollow shell and has an opening 61. The base plate 11 of the insulating base 10 seals the opening 61, and the outer surface of the base plate 11 away from the partition 12 is exposed from the shell 60, so that the battery pack 30 may be accommodated and protected in the shell 60 to avoid the battery pack 30 from being deformed or damaged. In the meantime, each bridge portion 23 may also be accommodated in the shell 60, and only the wire connecting part 24 is exposed outside for users to connect an electric wire. In some embodiments, the battery module may further include a plurality of bolts A. A locking hole 121 is respectively formed on front and back sides of the partition 12 of the insulating base 10, and the shell 60 has a through hole 62 corresponding to each locking hole 121, and each bolt A passes through each corresponding through hole 62 and is locked to each locking hole 121 to fix the shell 60 and the insulating base 10, and maintenance personnel may remove the battery pack quickly for maintenance or replacement.

While this disclosure has been described by means of specific embodiments, numerous modifications and variations could be made thereto by those skilled in the art without departing from the scope and spirit of this disclosure set forth in the claims.

What is claimed is:

1. A battery module, comprising:
an insulating base, comprising a base plate and a partition disposed on a bottom of the base plate;
a pair of electrodes, disposed on the insulating base, and each of the electrodes comprising a bridge portion and a wire connecting part exposed from the insulating base;
a plurality of battery packs, each of the battery packs comprising a pair of lugs extended therefrom, wherein an end of at least a part of the lugs is attached to the bridge portion correspondingly, and the pair of lugs of each of the battery packs include a positive lug and a negative lug, the positive lug is located at one side of each battery pack, the negative lug is located at another side of each battery pack; and
a series electrode, comprising two welding sections and a turning section, wherein the welding sections are respectively disposed on opposite sides of the partition and located below the base plate, and the turning section is connected between the welding sections and buried in the partition, and the positive lug of one of the battery packs and the negative lug of another one of the battery packs are attached to the welding sections respectively.

2. The battery module according to claim 1, wherein at least a part of the lugs is welded to the bridge portion correspondingly.

3. The battery module according to claim 1, wherein the bridge portion of each electrode is embedded in the insulating base, and the wire connecting part of each electrode is attached to an outer surface of the insulating base.

4. The battery module according to claim 3, wherein each wire connecting part comprises a stud extended perpendicularly in a direction away from the bridge portion.

5. The battery module according to claim 1, wherein the pair of electrodes comprise a positive electrode and a negative electrode, and at least a part of the positive lug is attached to the bridge portion of the positive electrode, and at least a part of the negative lug is attached to the bridge portion of the negative electrode.

6. The battery module according to claim 1, wherein the series electrode comprises a detection column disposed protrusively and passing through the base plate.

7. The battery module according to claim 1, further comprising a shell with an opening, and the insulating base configured to seal the opening to accommodate the battery pack in the shell.

8. The battery module according to claim 7, further comprising a bolt, the insulating base comprising a locking hole defined on a side thereof, and the shell comprising a through hole corresponding to the locking hole, and the bolt passing through the through hole to be locked in the locking hole.

* * * * *